United States Patent
Kohno et al.

[19]

[11] Patent Number: 6,138,636
[45] Date of Patent: Oct. 31, 2000

[54] APPARATUS FOR CONTROLLING MULTI-CYLINDER INTERNAL COMBUSTION ENGINE WITH PARTIAL CYLINDER SWITCHING-OFF MECHANISM

[75] Inventors: Ryuji Kohno; Toshiyuki Suzuki; Eitetsu Akiyama; Morio Fukuda, all of Tochigi-ken, Japan

[73] Assignee: Honda Giken Kogyo Kabushiki Kaisha, Tokyo, Japan

[21] Appl. No.: 09/317,622

[22] Filed: May 25, 1999

[30] Foreign Application Priority Data

| May 26, 1998 | [JP] | Japan | 10-144344 |
| May 26, 1998 | [JP] | Japan | 10-144345 |
| May 26, 1998 | [JP] | Japan | 10-144346 |

[51] Int. Cl.$^7$ ............................................. F02D 13/06
[52] U.S. Cl. ............................................. 123/198 F
[58] Field of Search ........................... 123/198 F, 90.15, 123/90.16

[56] References Cited

U.S. PATENT DOCUMENTS

| 4,442,806 | 4/1984 | Matsuura et al. | 123/198 F |
| 5,235,940 | 8/1993 | Nakatani | 123/90.16 |
| 5,492,100 | 2/1996 | Ishii et al. | 123/481 |
| 5,537,963 | 7/1996 | Hasebe et al. | 123/90.16 |

FOREIGN PATENT DOCUMENTS

| 0 573 662 A1 | 12/1993 | European Pat. Off. . |
| 2 101 683 | 1/1983 | United Kingdom . |

*Primary Examiner*—Willis R. Wolfe
*Assistant Examiner*—Hyder Ali
*Attorney, Agent, or Firm*—Armstrong, Westerman, Hattori, McLeland & Naughton

[57] ABSTRACT

In an apparatus for controlling a multi-cylinder internal combustion engine with partial cylinder switch-off mechanism which is switchable between an all-cylinder operation mode in which all cylinders are operated and a partial-cylinder operation mode in which operation of partial cylinders is suspended, the operation of intake valves and exhaust valves is suspended or resumed in a predetermined order with respect to all of the suspended cylinders irrespective of a rotational frequency of the engine. There are provided a solenoid valve on an intake side and a solenoid valve on an exhaust side for switching input hydraulic pressures for hydraulically operated switching devices respectively on the intake side and on the exhaust side between the driving state and the drive-free state. At the time of switching the operation, one of the solenoid valves on the intake side and the exhaust side is driven in advance. The subsequent number of rotations of a crankshaft is counted. When the number of this counting has reached a predetermined value, the solenoid valve on the other side is driven.

5 Claims, 8 Drawing Sheets

APPARATUS FOR CONTROLLING MULTI-CYLINDER INTERNAL COMBUSTION ENGINE WITH PARTIAL CYLINDER SWITCHING-OFF MECHANISM

BACKGROUND OF THE INVENTION

1. Field of the Invention

The present invention relates to an apparatus for controlling a multi-cylinder internal combustion engine with partial cylinder switch-off mechanism. The engine is capable of regulating the number of cylinders in operation between the following two modes, one being a mode in which all cylinders are operated (hereinafter called "all-cylinder operation"), the other being a mode in which some cylinders are operated while the other cylinders (i.e., partial cylinders) are suspended in operation by switching them off (hereinafter called "partial-cylinder operation").

2. Description of the Related Art

This type of conventional multi-cylinder internal combustion engine is provided with hydraulically operated valve switching means on an intake side and on an exhaust side, respectively, to switch intake valves and exhaust valves for part of cylinders between a driving state and a state in which the driving of the valves is stopped or suspended (also called a "drive-free state"). At the time of partial-cylinder operation, the intake valves and the exhaust valves of part of the cylinders are switched to the drive-free state.

In order to avoid a loss in torque due to compression of intake air at a compression stroke or at an exhaust stroke in cylinders not in operation (hereinafter also called "suspended cylinders"), the driving of inlet valves must be stopped ahead of, or prior to, exhaust valves at the time of switching from the all-cylinder operation to the partial-cylinder operation. On the other hand, in order to prevent oil from flowing into the suspended cylinders, the driving of the exhaust valves must be stopped ahead of the intake valves at the time of switching from the all-cylinder operation to the partial-cylinder operation. Further, in order to avoid a deviation in an air/fuel ratio at the time of returning back to the all-cylinder operation, due to gas which may remain in the suspended cylinders, the exhaust valves must be returned to driving ahead of the intake valves at the time of switching from the partial-cylinder operation to the all-cylinder operation.

There is known an apparatus as described hereinbelow (see the item entitled "Problems that the Invention is to Solve" in Japanese Published Unexamined Patent Application No. 74545/1996). Namely, in this conventional apparatus, in order to stop the driving of, or to resume the driving of, one of the intake valves and the exhaust valves ahead of the other thereof at the time of switching between the all-cylinder operation and the partial-cylinder operation, there is separately provided a control valve for switching the input hydraulic pressure to each of valve switching means on the intake side and on the exhaust side, respectively. At the time of switching of operation, the control of switching of the hydraulic pressure by the control valve on the intake side and the control of switching of the hydraulic pressure by the control valve on the exhaust side are performed at a predetermined time lag.

If the control valve on the intake side and the control valve on the exhaust side are controlled at a time lag as in the above-described conventional example, and at the time, e.g., of switching from the all-cylinder operation to the partial-cylinder operation, if the switching control of the hydraulic pressure by the control valve on the exhaust side is performed at a predetermined time after the switching control of the hydraulic pressure by the control valve on the intake side has been finished, there is the following possibility. Namely, in case the operation of a plurality of cylinders is suspended, there is a possibility, depending on a rotational frequency of the engine, that the switching control of the hydraulic pressure is performed by the control valve on the intake side during the compression stroke of any one of the cylinders and that the switching control of the hydraulic pressure by the exhaust valves is performed during the ignition stroke. According to this arrangement, the exhaust valves will no longer be opened in the exhaust stroke and, consequently, the driving of the exhaust valves will substantially be stopped ahead of the intake valves. Therefore, in the example of the above-described conventional apparatus, there is no guarantee that the driving of the intake valves and the exhaust valves in all of the suspended cylinders is stopped or resumed in a given order.

In view of the above-described points, the present invention has an object of providing an apparatus for controlling a multi-cylinder internal combustion engine, in which it is possible to stop the driving of, or to resume the driving of, the intake valves and the exhaust valves for all of the suspended cylinders in a given order irrespective of the rotational frequency of the engine.

SUMMARY OF THE INVENTION

In order to attain the above and other objects, the present invention is an apparatus for controlling a multi-cylinder internal combustion engine with partial cylinder switch-off mechanism. The engine is switchable between an all-cylinder operation in which all cylinders are operated and a partial-cylinder operation in which operation of partial cylinders is suspended. The apparatus comprises: hydraulically operated valve switching means on an intake side and on an exhaust side, respectively, for switching intake valves and exhaust valves of the partial cylinders between a driving state and a drive-free state, wherein the intake valves and the exhaust valves of the partial cylinders are switched, during the partial-cylinder operation, into the drive-free state; a control valve on the intake side for switching a hydraulic pressure inputted to the hydraulically operated valve switching means on the intake side between a hydraulic pressure to bring the intake valves into the driving state and a hydraulic pressure to bring the intake valves to the drive-free state; a control valve on the exhaust side for switching a hydraulic pressure inputted to the hydraulically operated valve switching means on the exhaust side between a hydraulic pressure to bring the exhaust valves into the driving state and a hydraulic pressure to bring the exhaust valves to the drive-free state; and control means for performing the following steps when the intake valves and the exhaust valves of the partial cylinders are switched from one of the driving state and the drive-free state to the other of the states. The steps include: performing hydraulic pressure switching by one of the control valve on the intake side and the control valve on the exhaust side ahead of hydraulic pressure switching by the other of the control valves; counting a subsequent number of rotation of a crank shaft of the engine; and, when the counted number of rotation has reached a predetermined value, performing hydraulic pressure switching by the other of the control valves.

Talking about an example when the intake valves and the exhaust valves of the partial cylinders are switched from the driving state to the drive-free state, an explanation is made about the case in which the driving of the intake valves is stopped ahead of (or prior to) the exhaust valves so that the exhausting from the suspended cylinders is stopped after the air intake into the suspended cylinders has been stopped. In such a case, the above-described predetermined value is set depending on that number of rotation of the crank shaft which is required by the crank shaft from the point of time of performing the control of switching the hydraulic pressure by the control valves on the intake side to the point of time of completion of the intake stroke of all the suspended cylinders. By employing this arrangement, the driving of the exhaust valves is stopped after the air intake into all of the suspended cylinders has been stopped.

As described above, according to the present invention, the stopping of the driving of, or the resumption of the driving of, the intake valves and the exhaust valves can be performed in a given order with respect to all of the suspended cylinders, irrespective of the rotational frequency of the engine.

In the embodiment to be described hereinafter, what corresponds to the above-described control means is the processing from step S9-5 to step S9-9 in FIG. 5 and the processing from step S26-1 to step S26-7 in FIG. 6. A set value NVTEXDO at step S9-2 in FIG. 5 and a set value NCSENDO at step S26-3 in FIG. 6 correspond to the above-described predetermined value.

In the multi-cylinder internal combustion engine with partial cylinder switch-off mechanism, the output torque is likely to fluctuate at the time of switching from the all-cylinder operation to the partial-cylinder operation, thereby giving rise to shocks.

In order to eliminate this kind of disadvantage in the occurrence of shocks, there has hitherto been known the following. Namely, as disclosed in Japanese Published Unexamined Patent Application No. 103430/1987, there is provided a controller which electronically controls a throttle opening degree of an engine via an electric motor or the like. When the engine operation is switched from the all-cylinder operation to the partial-cylinder operation, the throttle opening degree of the engine is switched to that throttle opening degree for the partial-cylinder operation which is set such that an engine output torque does not change before and after the switching, whereby the fluctuation in torque at the time of switching is prevented. However, even if the throttle opening degree is changed, at the time of switching to the partial-cylinder operation, to the throttle opening degree for the partial-cylinder operation, the amount of air intake into the suspended cylinders does not change immediately. Due to this delay in response, the engine output torque temporarily fluctuates, resulting in the occurrence of the torque shocks.

As a solution to the problem, it is preferable to provide: first throttle control means which changes the throttle opening degree by a predetermined amount toward the throttle opening degree for the partial-cylinder operation when an engine operating state has fallen into a predetermined operating region for performing the partial-cylinder operation and thereafter switches to the partial-cylinder operation; and second throttle control means which makes the throttle opening degree, for an initial predetermined period of time after having switched to the partial-cylinder operation, to a throttle opening degree which exceeds the throttle opening for the partial-cylinder operation. The above-described predetermined period of time is arbitrarily set within a range which can improve the delay in response in the amount of intake air at an initial period after switching to the partial-cylinder operation.

As a result of the change by the first throttle control means of the throttle opening degree before switching to the partial-cylinder operation, the delay in response in the amount of intake air after the switching from the all-cylinder operation to the partial-cylinder operation is improved. Further, as a result of an overshooting control by the second throttle control means of the throttle opening degree at an initial period after switching to the partial-cylinder operation, the amount of intake air varies quickly. In this manner, the amount of intake air changes with good response to the value which corresponds to the throttle opening degree for the partial-cylinder operation. The temporary fluctuations in the engine output torque at the time of switching to the partial-cylinder operation can thus be restricted, thereby reducing the torque shocks to the best extent possible.

The change in the throttle opening degree with the first throttle control means is performed during the all-cylinder operation. It follows that, if the above-described predetermined amount is set to a large amount, the engine output torque excessively changes immediately before switching to the partial-cylinder operation, with the result that the torque shocks occur at the time of switching from the all-cylinder operation to the partial-cylinder operation. Therefore, the above-described predetermined amount should be set to such a value that the amount of intake air begins to change at the time of switching.

By performing even one of the change in the throttle opening degree before switching to the partial-cylinder operation and the overshooting control in the throttle opening degree at an initial period after the switching, the delay in response in the amount of intake air can be improved to thereby reduce the torque shocks to a certain degree. Therefore, only one of the above-described first throttle control means and the second throttle control means may be provided.

In the embodiment to be described hereinafter, what corresponds to the above-described first throttle control means is the processing from step S4 to step SB in FIG. 3. What corresponds to the above-described second throttle control means is the processing from step S11 to step S17 in FIG. 3.

Before the engine has been warmed up, the friction loss in the engine is large. As a result, the lower the temperature becomes, the larger becomes the throttle opening degree which is required to obtain the same output torque. As a solution, there is conventionally known the following. Namely, a setting is made of a temperature correction coefficient depending on the engine temperature, e.g., a cooling water temperature. The throttle opening degree at the time of low water temperature is thus corrected to increase it.

However, in the multi-cylinder internal combustion engine with partial cylinder switch-off mechanism, the friction loss in the suspended cylinders at the time of partial-cylinder operation must be covered or supplemented by the remaining cylinders. If the partial-cylinder operation is performed at the time of low water temperature, the friction loss in the suspended cylinders can no longer be covered by the remaining cylinders in operation, with the result that the operating state of the engine becomes unstable. As a solution, it is conventionally so arranged that the all-cylinder operation is performed, even in the partial-cylinder operation region, at the time of low water temperature (see operation manual '92-10, No. 103681 of a new model car called by a pet name of "Mirage.Lancer" manufactured by Mitsubishi Jidosha Kogyo Kabushiki Kaisha). In the arrangement of this prior art, however, the partial-cylinder operation is prohibited at the time of low water temperature. This will be a disadvantage in an attempt to improve the specific fuel consumption by adopting the partial-cylinder operation.

It is preferable to provide correcting means which sets a correcting coefficient for the all-cylinder operation and a correcting coefficient for the partial-cylinder operation which is larger than the correcting coefficient for the all-cylinder operation, the correcting coefficients serving as temperature correcting coefficients for increasing, at a time of low temperature, the throttle opening degree depending on an engine temperature, the correcting means operating to switch the temperature correcting coefficients between the correcting coefficient for the all-cylinder operation and the correcting coefficient for the partial-cylinder operation depending on whether the operation is in the all-cylinder operation or in the partial-cylinder operation. According to this arrangement, the correction amount for increasing the throttle opening degree at the time of low temperature becomes larger in the partial-cylinder operation than in the all-cylinder operation. The friction loss in the suspended cylinders is thus compensated for by an increase in the output due to an increase in the amount of intake air into the cylinders in operation. Therefore, even if the partial-cylinder operation is performed at the time of low temperature, the engine can be operated stably. As a result, it becomes possible to perform the partial-cylinder operation at the time of low temperature.

In the embodiment to be described hereinafter, what corresponds to the above-described correction means is the processing for computing a command value for the throttle opening degree THCMD as shown in FIG. 4. In the embodiment to be described hereinafter, the cooling water temperature was used as a parameter to show the engine temperature. However, other than the cooling water temperature, such as the oil temperature of the engine lubricating oil, may also be used as long as it relates to the engine temperature. The above-described low temperature means the state before the engine has completed its warming up and means below 80° C., for example, in case of the cooling water temperature.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
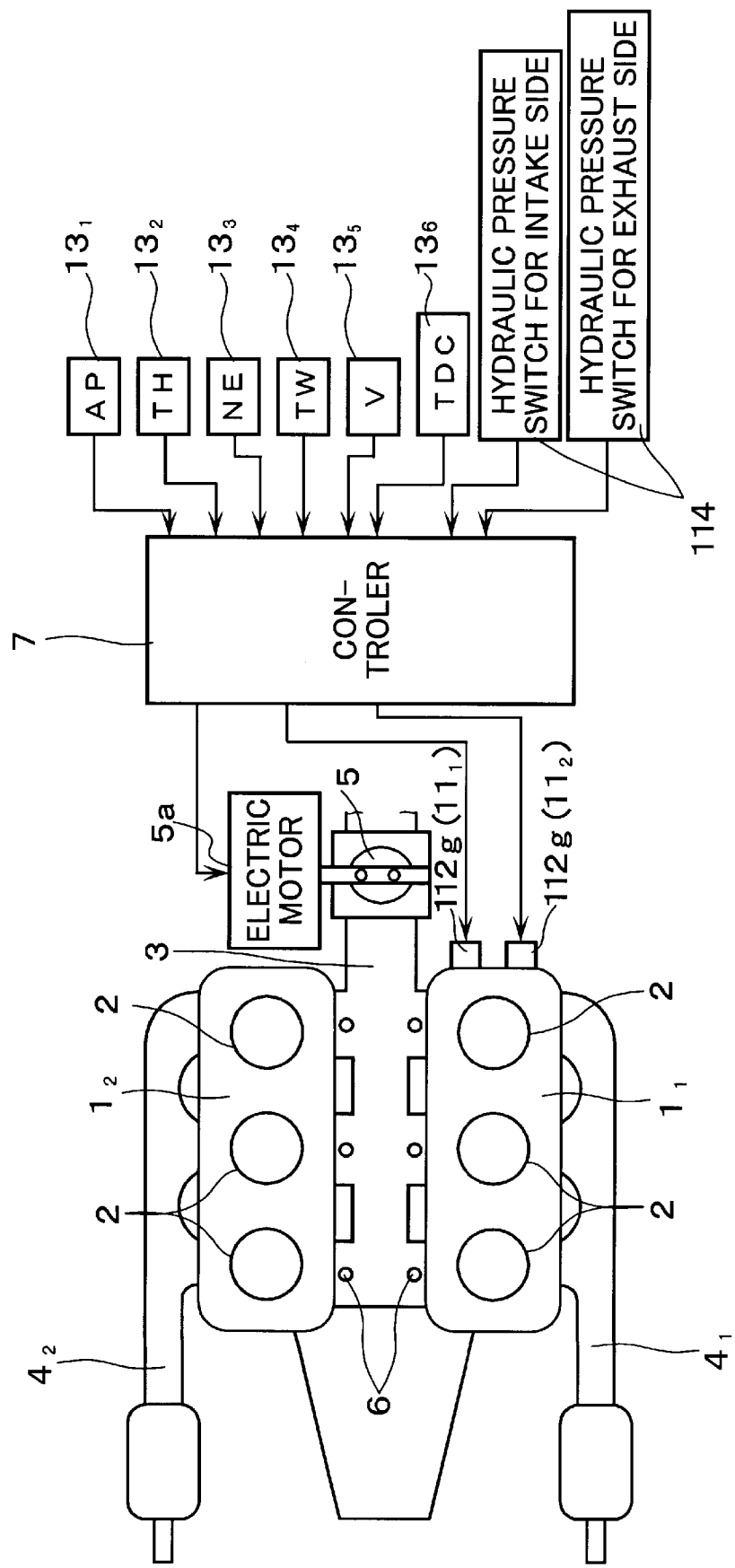
FIG. 1 is a schematic diagram showing an example of an engine to which the apparatus of the present invention is applied.

FIG. 1 shows a six-cylinder V-type engine in which three cylinders 2 are disposed in a pair of first and second banks $1_1$, $1_2$, respectively. There are provided an intake manifold 3 which is common to both the banks $1_1$, $1_2$, and separate exhaust manifolds $4_1$, $4_2$ for the first bank $1_1$ and for the second bank $1_2$, respectively. A throttle valve 5 is interposed on an upstream side of the intake manifold 3. A fuel injection valve 6 is provided in each of the branches which lie on a downstream side of the intake manifold 3 and which are in communication with respective cylinders 2. It is thus so arranged that each of the cylinders 2 can be supplied with fuel from each of the fuel injection valves 6.

The throttle valve 5 is driven to be opened and closed by an electric motor 5a. A throttle opening degree TH is electronically controlled by a controller 7 which is made up of a microcomputer for controlling the electric motor 5a.

Figure 2:
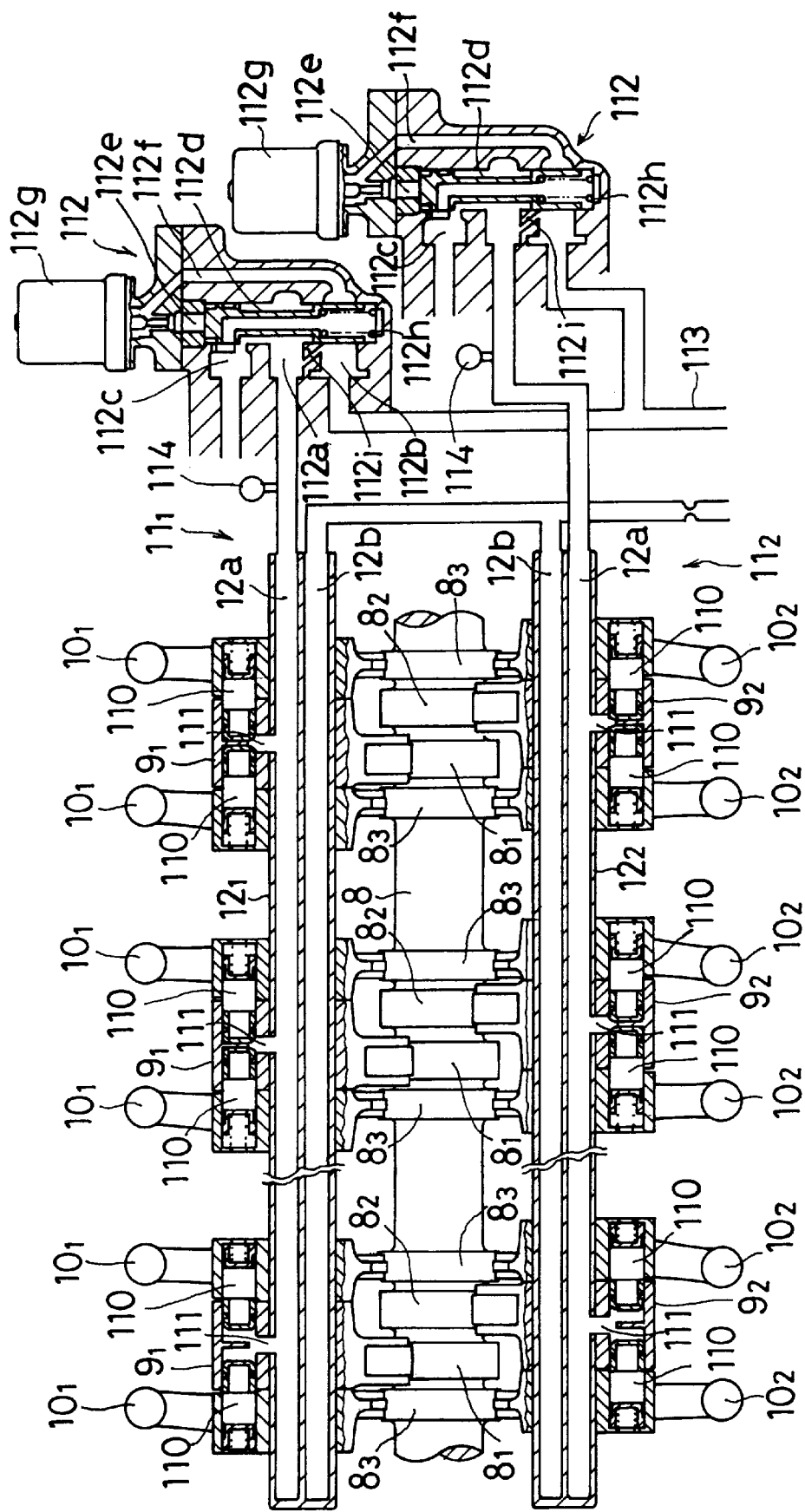
FIG. 2 is a schematic diagram showing switching means which switches intake valves and exhaust valves between a driving state and a drive-free state.

It is also so arranged that the driving to open and close intake valves and exhaust valves for the cylinders 2 in the first bank $1_1$ can be stopped, whereby the cylinders 2 in the first bank $1_1$ are suspended in operation (or are allowed to be drive-free). As shown in FIG. 2, a valve driving cam mechanism for the cylinders 2 in the first bank $1_1$ has the following construction. Namely, a pair of intake valves and a pair of exhaust valves for each of the cylinders are driven to be opened and closed via each pair of free rocker arms $10_1$, $10_2$ on the intake side and on the exhaust side, respectively, by means of those driving rocker arms $9_1$, $9_2$ on the intake side and on the exhaust side which come into contact with driving cams $8_1$, $8_2$ on the intake side and on the exhaust side, respectively, on a cam shaft 8. There are provided hydraulically operated changeover means $11_1$, $11_2$ on the intake side and on the exhaust side which establish the connection, and release the connection, between each of the driving rocker arms $9_1$, $9_2$ on the intake side and on the exhaust side and each pair of the free rocker arms $10_1$, $10_2$. When the connection between the driving rocker arms $9_1$, $9_2$ and the free rocker arms $10_1$, $10_2$ is released, the free rocker arms $10_1$, $10_2$ remain in contact with circular idling cams $8_3$, whereby the intake valves and the exhaust valves are kept closed. As a result, the operation mode is switched from an all-cylinder operation mode in which all of the cylinders 2 in both the banks $1_1$, $1_2$ are operated to a partial-cylinder operation mode in which the operation of the cylinders 2 in the first bank $1_1$ is suspended (or stopped).

Each of the changeover means $11_1$, $11_2$ on the intake side and on the exhaust side is made up of: connecting pins 110 which can be fitted through the respective driving rocker arms $9_1$, $9_2$ and the respective free rocker arms $10_1$, $10_2$; pressure chambers 111 which are respectively formed in the driving rocker arms $9_1$, $9_2$ so as to urge the connecting pins 110 toward the free rocker arms $10_1$, $10_2$; and a control valve 112 which controls the hydraulic pressure in the pressure chambers 111 via an oil passage 12a which is formed in each of rocker arm shafts $12_1$, $12_2$ on the intake side and on the exhaust side, respectively.

Each of the control valves 112 is provided with a spool 112d and a solenoid valve 112g. The spool 112d is switchable between an open position in which an output port 112a which is in communication with the oil passage 12a is connected to an input port 112b which is in communication with an oil supply passage 113, and a closed position (i.e., the illustrated position) in which the above-described connection is shut off to thereby connect the output port 112a to a drain port 112c. The solenoid valve 112g is controlled by the above-described controller 7 and is interposed in a pilot passage 112f which inputs a hydraulic pressure from the oil supply passage 113 into a pilot chamber 112e which urges the spool 112d towards the open position. When the solenoid valve 112g is opened, the spool 112d is switched to the open position against a spring 112h by the input of a hydraulic pressure into the pilot chambers 112e. The pressure chambers 111 thus receive an input of the hydraulic pressure and, as a result, the connecting pins 110 are urged into the free rocker arms $10_1$, $10_2$, whereby the connection between the driving rocker arms $9_1$, $9_2$ and the free rocker arms $10_1$, $10_2$ is released. Further, there is provided a bypass orifice 112i which normally (i.e., always) communicates the output port 112a with the input port 112b of the control valve 112. It is thus so arranged that, when the spool 112d is in the closed position, the oil passage 12a is filled with low-pressure oil. In this arrangement, by switching the spool 112d to the open position, the hydraulic pressure in the oil passage 12a, i.e., in the pressure chambers 111, can be boosted with a good response. Even if the hydraulic pressure in the pressure chambers 111 is boosted, the connecting pins 110 are prevented, while the intake valve and the exhaust valve are in the period of being opened, from being pushed towards the free rocker arms $10_1$, $10_2$ because of the friction due to a shear force which works between the driving rocker arms $9_1$, $9_2$ and the free rocker arms $10_1$, $10_2$. When the intake valves and the exhaust valves have been closed, the connecting pins 110 will be forced into the free rocker arms $10_1$, $10_2$, whereby the connection between the driving rocker arms $9_1$, $9_2$ and the free rocker arms $10_1$, $10_2$ is released. In the figure, reference numeral 114 is a normally closed hydraulic pressure switch which is switched off when the hydraulic pressure in the output port 112a of the control valve 112 has risen. Reference numeral 12b is an oil passage for lubricating oil which is formed in the rocker arm shafts $12_1$, $12_2$.

The above-described controller 7 receives inputs in the form of signals from the following sensors, namely: a sensor $13_1$ for detecting an amount of depressing an accelerator pedal AP (hereinafter called an accelerator opening degree); a sensor $13_2$ for detecting a throttle opening degree TH; a sensor $13_3$ for detecting a rotational frequency of the engine NE; a sensor $13_4$ for detecting a temperature of cooling water TW; a sensor $13_5$ for detecting a vehicle speed V; a pulse generator $13_6$ for generating a pulse of a predetermined phase (hereinafter celled a TDC signal) at every one revolution of a crank shaft of the engine; and respective hydraulic pressure switches 114 for the changeover means $11_1$, $11_2$ on the intake side and on the exhaust side. Based on these signals, control is made of the throttle opening degree TH and of the solenoid valve 112g for the switching means $11_1$, $11_2$ on the intake side and on the exhaust side (In this specification, the reference characters, etc. are normally given at the end of the whole description. For example, the "rotational frequency 'NE' of the engine" is described as the "rotational frequency of the engine 'NE'").

Figure 3:
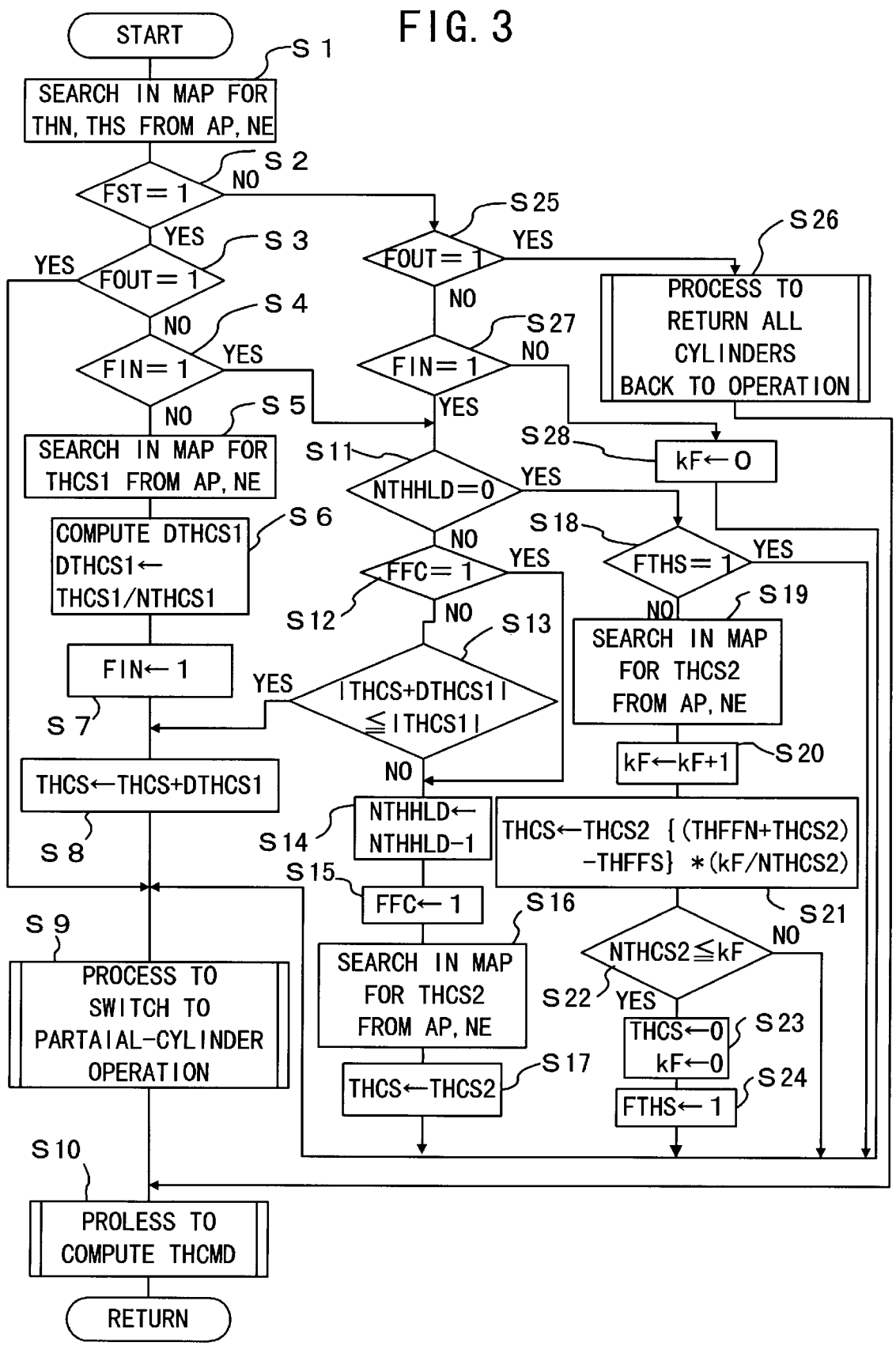
FIG. 3 is a flow chart showing a switching control program for switching between an all-cylinder operation and a partial-cylinder operation.

The details of the control are shown in FIG. 3. This control is performed once each time a TDC signal is inputted. First, at step S1, the opening degree for the all-cylinder operation THN and the opening degree for the partial-cylinder operation THS are obtained. The value THN is that throttle opening degree at the time of all-cylinder operation which is necessary to obtain a predetermined output torque of the engine in each of the operating states which are defined with the accelerator opening degree AP and the rotational frequency of the engine NE as parameters. The value THS is that throttle opening degree at the time of partial-cylinder operation which is necessary to obtain the same output torque as at the time of all-cylinder operation in each of the operating states. Both THN and THS are stored as map data with AP and NE as parameters. THN and THS which correspond to AP and NE at the present time are searched.

Then, at step S2, a discrimination is made as to whether a flag showing that the conditions for partial-cylinder operation have been met, FST, is set to 1. The time when the operation of the cylinders 2 in the first bank $1_1$ can be suspended or stopped in operation is when a stable operation can be maintained by the operation of the cylinders 2 in the second bank $1_2$ alone, namely, when the following three specific conditions have been met: i.e., when the rotational frequency of the engine NE is in a medium speed range (e.g., 1500 rpm<NE<3500 rpm); when the vehicle speed V is above a speed at which the start of the vehicle running has been finished (e.g., V>15 km/h); and when the engine is under a low load (e.g., 0.5°<TH<) 20°). FST is set to 1 by a background processing when the above three conditions have been met.

If FST=1, the program proceeds to step S3, where a discrimination is made as to whether a flag showing that the cylinders are being suspended in operation, FOUT, is set to 1. The flag FOUT is initially reset to 0 and, at the time of switching from the all-cylinder operation to the partial-cylinder operation, a discrimination is made that FOUT≠1, whereby the program proceeds to step S4. At step S4, a discrimination is made as to whether the flag showing that the cylinders are in the process of switching to the partial-cylinder operation, FIN, is set to 1. The flag FIN is also initially reset to 0 and therefore a discrimination of FIN≠1 is made. The program thus proceeds to step S5, where an amount of change in the throttle opening degree before the switching operation, THCS1, is obtained. THCS1 is stored as map data with the accelerator opening degree AP and the engine rotational frequency NE as parameters. THCS1 corresponding to the AP and NE at the present moment are searched in the map. Then, the program proceeds to step S6 where, in order to flatten (or smooth) the throttle opening degree by the amount of THCS1, a flattened value DTHCS1 is computed by dividing THCS1 by a predetermined number of flattening operations NTHCS1. At the next step S7, FIN is set to 1 and, at step S8, the amount of change in the throttle opening degree THCS is made to be a value which is obtained by adding DTHCS1 to a previous value.

Figure 4A:
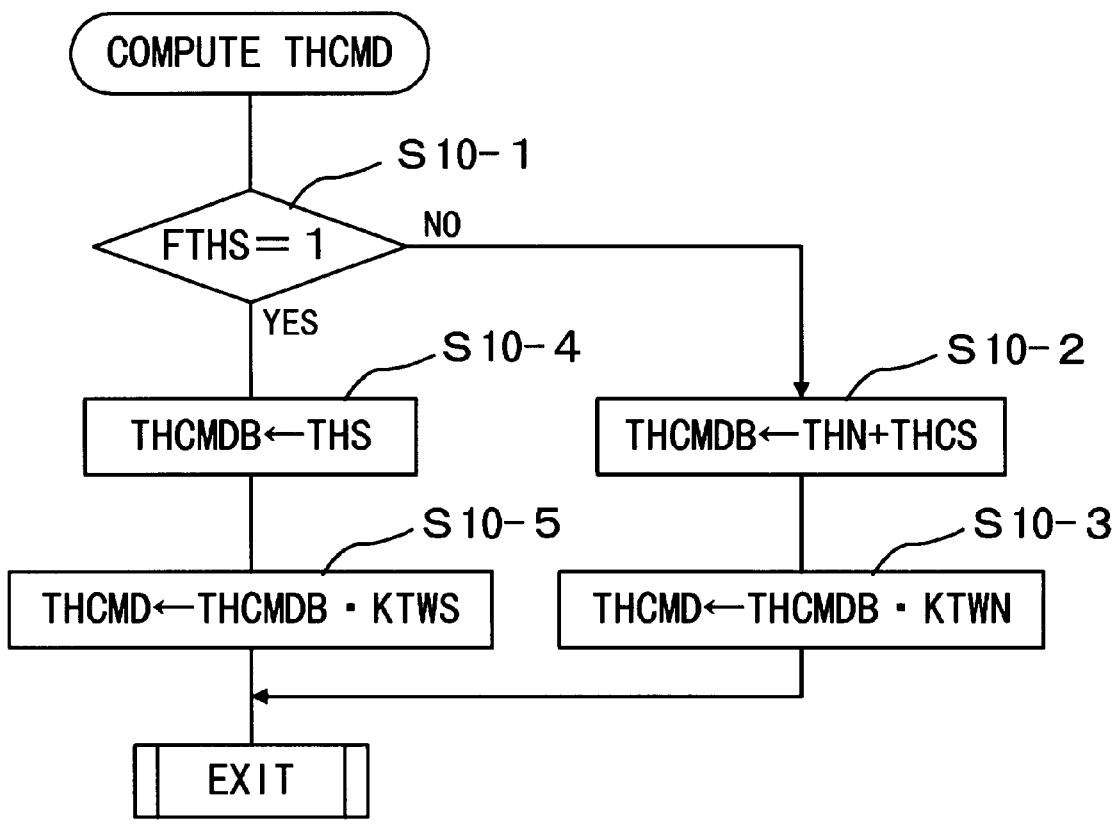
FIG. 4A is a flow chart showing a program for computing a command value of a throttle opening degree.

Thereafter, the program proceeds to step S9, where a processing of switching to the partial-cylinder operation is performed. This operation is described in more detail hereinbelow. The program then proceeds to step S10, where a command value THCMD of the throttle opening degree is computed, thereby completing one round of control operations. Details of computing THCMD are shown in FIG. 4A. First, at step S10-1, a discrimination is made as to whether the flag for selecting the opening degree for the partial-cylinder operation, FTHS, is set to 1. Since the flag FTHS has initially been reset to 0, a discrimination is made that FTHS≠1. The program thus proceeds to step S10-2, where a basic command value of the throttle opening degree THCMDB is made to be a value which is obtained by adding the change amount THCS to the throttle opening degree for the all-cylinder operation THN. Then, at step S10-3, an actual command value of the throttle opening degree, THCMD, is made to be a value which is obtained by multiplying THCMDB by a correction factor for the all-cylinder operation, KTWN, depending on the water temperature TW. When FTHS is set to 1, THCMD is made at step S10-4 to be the opening degree for the partial-cylinder operation THS. Thereafter, at step S10-5, THCMDB is made to be a value which is obtained by multiplying THCMDB by a correction factor for the partial-cylinder operation, KTWS, depending on the water temperature TW.

Figure 4B:
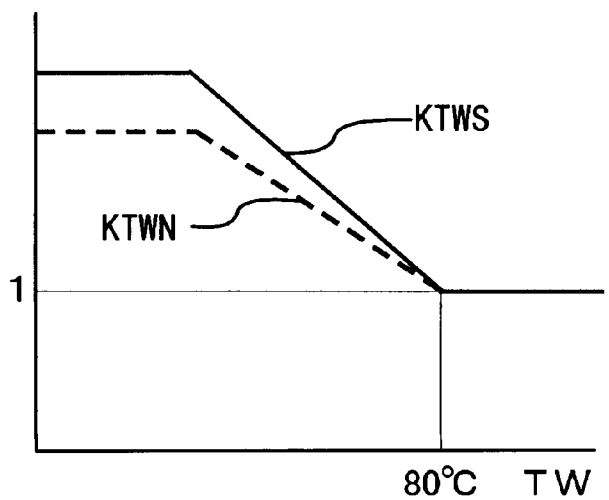
FIG. 4B is a graph showing table data of correction coefficients for the all-cylinder operation and the partial-cylinder operation, for correcting the throttle opening degree depending on a water temperature.

Before the engine has been warmed up, the friction loss in the engine is large and, the lower the temperature is, the larger becomes the throttle opening degree which is required to obtain the same output torque. Particularly, at the time of the partial-cylinder operation, the friction loss on the side of the first bank $1_1$ must be covered or supplemented by the side of the second bank $1_2$. Therefore, if the correction factor depending on the water temperature TW is made the same with each other at the time of the all-cylinder operation and at the time of the partial-cylinder operation, the engine can no longer be stably operated, in case the partial-cylinder operation is performed before the engine has been warmed up. As a solution, in the embodiment of the present invention, the correction factor depending on the water temperature TW is exchanged between KTWN at the time of the all-cylinder operation and KTWS at the time of the partial-cylinder operation. The correction factor for the partial-cylinder operation KTWS is set larger, as shown in FIG. 4B, than the correction factor for the partial-cylinder operation KTWN. It is thus so arranged that the engine can be stably operated even if the partial-cylinder operation is performed before the engine warming up has been completed. Consequently, it becomes possible to perform the partial-cylinder operation even before the completion of the engine warming up, resulting in an improvement in the specific fuel consumption of the internal combustion engine.

Once the first round of control operations has been finished as described above, in the next round, a discrimination of FIN=1 is made at step S4 because FIN has been set to 1 at step S7 last time. The program thus proceeds to step S11, where a discrimination is made as to whether a counter value to hold the amount of change after the switching operation, NTHHLD, has become 0. NTHHLD is initially set to a predetermined set value NTHHLDO. Therefore, a discrimination of NTHHLD≠0 is made, and the program proceeds to step S12, where a discrimination is made as to whether a flag for cutting fuel FFC is set to 1. Since FFC is initially set to 0, a discrimination of FFC≠1 is made, and the program proceeds to step S13. At step S13, a discrimination is made as to whether an absolute value of a sum of the previous value of the amount of change in the throttle valve opening degree, THCS, and the flattened value DTHCS1 is below an absolute value of the amount of change in the throttle valve opening degree before the switching operation, THCS1. Until the condition of |THCS+DTHCS1|>|THCS1| has been met, the program proceeds to step S8, where THCS is changed stepwise by DTHCS1 each time the TDC signal is inputted. Therefore, as shown in range "A" in FIG. 7, the basic command value of the throttle opening degree THCMDB gradually changes from the opening degree for the all-cylinder operation THN.

Once THCS has become equal to THCS1, the program proceeds to step S14, where NTHHLD is deducted by 1. Then, at step S15, FFC is set to 1, and the fuel supply to the cylinders 2 in the first bank $1_1$ is stopped. Then, the program proceeds to step S16, where an amount of change in the throttle opening degree after the switching operation, THCS2, is obtained. THCS2 is stored as map data with the accelerator opening degree AP and the engine rotational frequency NE as parameters. THCS2 corresponding to AP and NE at the present time is searched in the map. Then, the program proceeds to step S17, where the amount of change in the throttle opening degree THCS is made to THCS2, and the program proceeds to step S9 and following steps to thereby complete the control operations in this round.

Next time, since FFC has been set to 1 at step S15 last time, the program proceeds to step S14 and following steps from step S12 without passing through step S13. Then, this processing is repeated from the time when FFC was set to 1, i.e., from the time when the operation was switched to the partial-cylinder operation as a result of stopping of the fuel supply to the cylinders 2 in the first bank $1_1$, to the time when the TDC signal has been inputted in the same number of times as that of NTHHLDO. The basic command value of the throttle opening degree THCMDB is maintained, as shown in range B in FIG. 7, at a value which is obtained by adding THCS2 to the opening degree for the all-cylinder operation THN.

Once NTHHLD has become 0 as a result of inputting the TDS signal in the same number of times as that of NTHHLDO, the program proceeds from step S11 to step S18, where a discrimination is made as to whether the flag for selecting the throttle opening degree for the partial-cylinder operation FTHS is set to 1. FTHS is initially reset to 0 and therefore a discrimination of FTHS≠1 is made, and the program proceeds to step S19, where THCS2 corresponding to AP and NE at the present time is searched in the map. Then, the program proceeds to step S20, where a counter value of performing the flattening operations kF is added by 1. The program thereafter proceeds to step S21, where THCS is made to the value which is obtained by the following formula $$THCS=THCS2-\{(THN+THCS2)-THS\}\cdot(kF/NTHCS2)$$

NTHCS2 is the number of flattening to flatten or smooth the throttle opening degree from a value which is obtained by adding the amount of change after the switching operation, THCS2, to the throttle opening degree for the all-cylinder operation, THN, to the throttle opening degree for the partial-cylinder operation, THS. At step S22, a discrimination is made as to whether kF has become the same in number as NTHCS2 or more. While kF<NTHCS2, the above-described processing is repeated. Each time the TDC signal is inputted, THCS changes stepwise by the flattening amount DTHCS2 which is obtained by substituting THN, THL and THCS2 corresponding to AP and NE at that point of time in the following formula $$DTHCS2=\{(THN+THCS2)-THS\}/NTHCS2$$

Figure 7:
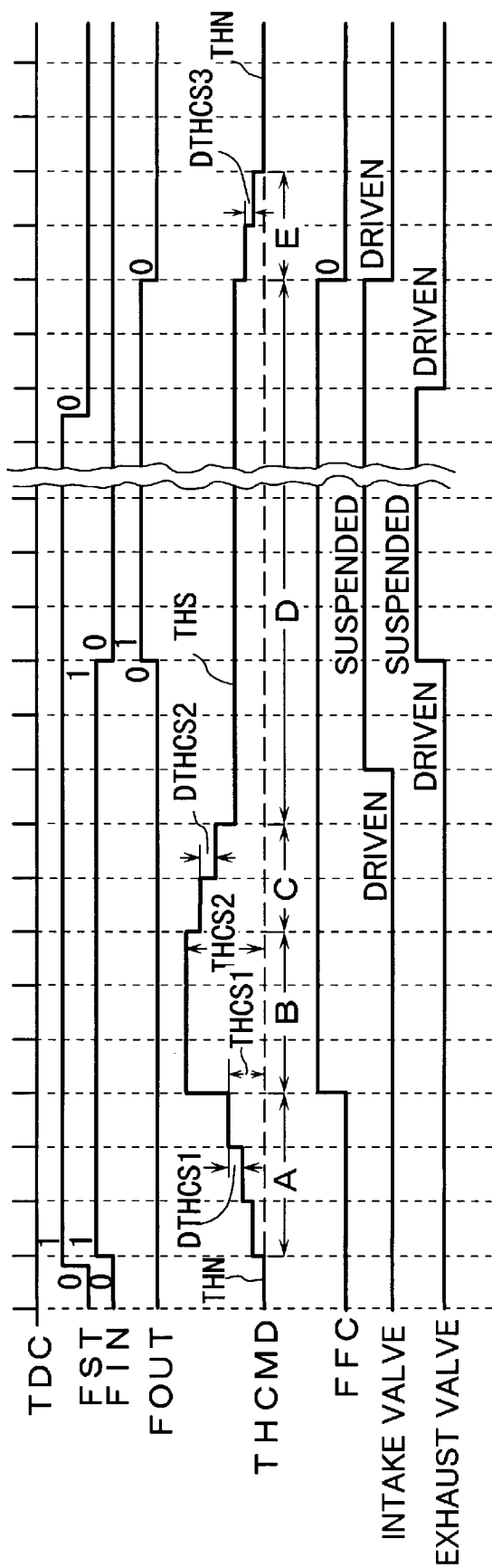
FIG. 7 is a time chart showing the changes in the throttle opening degree or the like by the control shown in FIG. 3.

In this manner, as shown in range C in FIG. 7, the basic command value for the throttle opening degree THCMDB gradually changes to THS from the value at the beginning of switching which is obtained by adding THCS2 to THN.

Once kF has become the same in number as NTHCS2, the program proceeds to step S23, where THCS and kF are respectively reset to 0 and, at step S24, FTHS is set to 1 and the program proceeds to step S9 and following steps. From the next time, a discrimination of FTHS=1 is made at step S18, and the program proceeds directly from step S18 to step S9 and following steps. In this manner, as shown in range D in FIG. 7, the basic command value of the throttle opening degree, THCMDB, is maintained at the throttle opening degree for the partial-cylinder operation THS.

Figure 8:
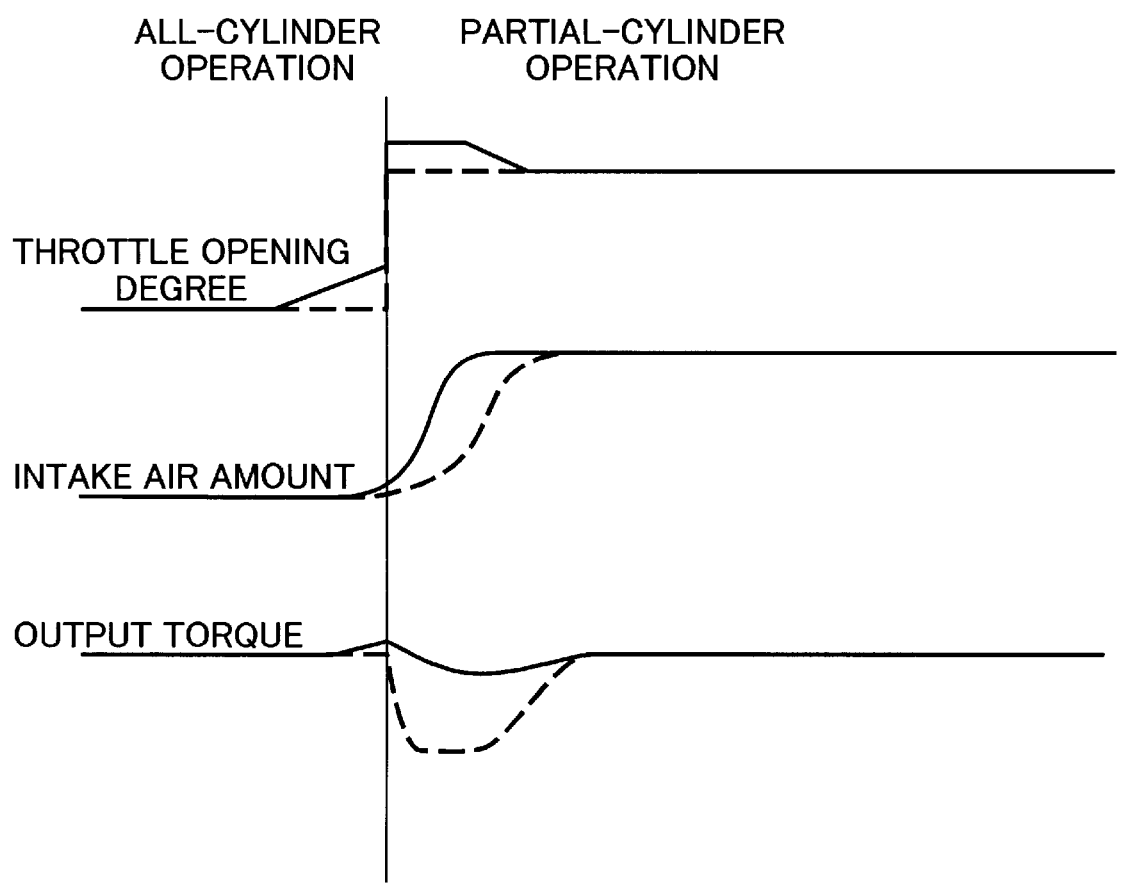
FIG. 8 is a graph showing the changes in the throttle opening degree, the amount of air intake, and an output torque.

The above-described amount of change before the switching operation, THCS1, is set to such a value that the intake air amount begins to change at the point of time of switching the operation to the partial-cylinder operation. The above-described amount of change after the switching operation, THCS2, is set to a value which is larger than the deviation between the throttle opening degree for the all-cylinder operation, THN, and the throttle opening degree for the partial-cylinder operation, THS. Further, the above-described holding counter set value NTHHLDO is stored as table data with the engine rotational frequency NE as a parameter and is set with a co-relationship with THCS2 so as to become a value which is necessary and sufficient for the intake air amount to be changed to an amount which corresponds to THS. FIG. 8 shows the changes in the throttle opening degree, the intake air amount, and the output torque of the engine. In the figure, solid lines show the change characteristics when the engine is controlled as described above. As compared with those dotted lines in the figure which show the change characteristics when the throttle opening degree is changed from THN to THS at the point of time of switching the throttle opening degree to the partial-cylinder operation, the intake air amount changes with good response to the amount corresponding to THS. As a result, temporary torque changes at the time of switching operation can be restricted and the torque shocks can be reduced to the best extent possible.

Depending on the operating conditions, the throttle opening degree for the partial-cylinder operation THS sometimes becomes smaller than that of the all-cylinder operation THN. In such a case, each of the above-described change amounts THCS1, THCS2 is set to a negative value. The above-described number of flattening NTHCS1 is stored as table data with the engine rotational frequency NE as a parameter, and the data setting is made such that the time required to change the throttle opening degree by an amount corresponding to THCS1 becomes constant irrespective of the engine rotational frequency NE. Further, the above-described number of flattening NTHCS2 is also stored as table data with the engine rotational frequency NE as a parameter, and is set to a minimum value required to prevent the torque changes at the time of change from THN+THCS2 to THS.

Figure 5:
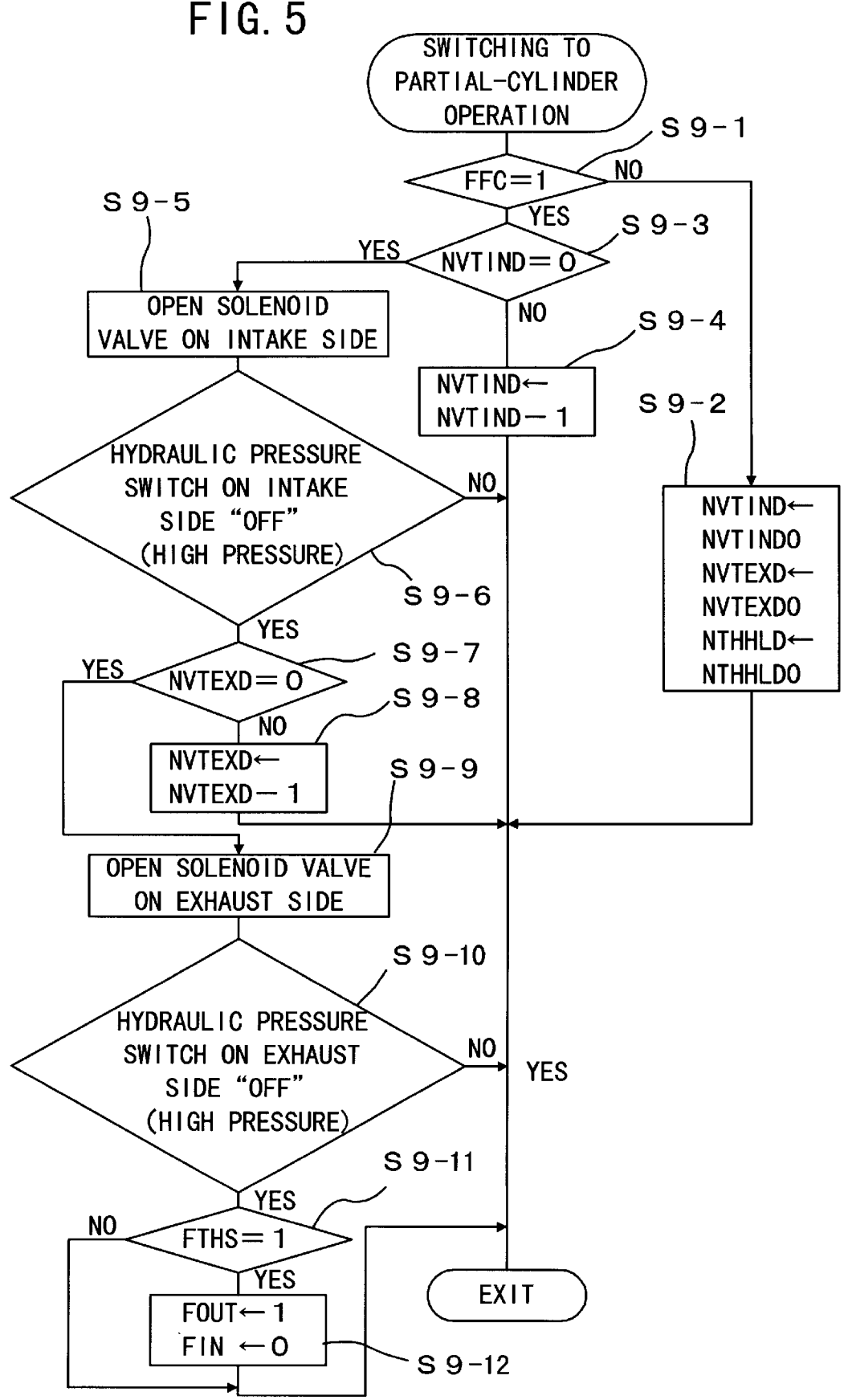
FIG. 5 is a flow chart showing a program for switching to the partial-cylinder operation.

The processing of switching to partial-cylinder operation which is performed at step S9 is shown in FIG. 5. First, at step S9-1, a discrimination is made as to whether FFC is set to 1. A discrimination of FFC≠1 is made until FFC is set to 1 at step S15. In this case, the program proceeds to step S9-2, where a counter value for the suspension of the air intake valves NVTIND, a counter value for the suspension of the exhaust valves, NVTEXD, and a counter value for holding the change amount after the switching operation, NTHHLD, are set to NVTINDO, NVTEXDO, NTHHLDO, respectively. Once FFC has been set to 1, the program proceeds to step S9-3, where a discrimination is made as to whether NVTIND has become 0. As long as NVTIND≠0, the program proceeds to step S9-4 to deduct NVTIND by 1. Then, when FFC has been set to 1 and the TDS signal has been inputted for the same number of times as that of NVTINDO, whereby a condition of NVTIND=0 has been met, the program proceeds to step S9-5. At this step S9-5, the solenoid valve 112g for the switching means 11$_1$ on the intake side is opened to release the connection between the driving rocker arms 9$_1$ on the intake side and the free rocker arms 10$_1$, 10$_1$, whereby the driving of the intake valves of the cylinders 2 in the first bank 1$_1$ is stopped. NVTINDO is set to secure cycles necessary to attain complete combustion and exhausting of the fuel supplied before stopping the fuel supply. In FIG. 7, NVTINDO is set to 6 so that the driving of the intake valves is stopped after 6 numbers of rotations of the crank shaft from the stopping of the fuel supply.

When the solenoid valve 112g for the switching means 11$_1$ on the intake side is opened, a discrimination is then made at step S9-6 as to whether the hydraulic pressure switch 114 of the switching means 11$_1$ on the intake side has been switched off, i.e., as to whether the hydraulic pressure in the switching means 11$_1$ has actually increased. When the hydraulic pressure has increased, the program proceeds to step S9-7, where a discrimination is made as to whether NVTEXD has become 0. While NVTEXD≠0, the program proceeds to step S9-8, where NCTEXD is deducted by 1. Then, when the hydraulic pressure in the switching means 11$_1$ on the intake side has risen and the TDS signal has been inputted in the same number of times as that of the NVTEXDO, whereby the condition of NVTEXD=0 has been met, the program proceeds to step S9-9. At this step S99, the solenoid valve 112g for the switching means 112 on the exhaust side is opened to release the connection between the driving rocker arms 9$_2$ on the exhaust side and the free rocker arms 10$_2$, 10$_2$, whereby driving of the exhaust valves of the cylinders 2 in the first bank 1$_1$ is stopped. Then, at step S9-10, a discrimination is made as to whether the hydraulic pressure switch 114 of the switching means 11$_2$ on the exhaust side has been switched off, i.e., whether the hydraulic pressure in the switching means 11$_2$ has actually increased. When the hydraulic pressure has risen, the program proceeds to step S9-11, where a discrimination is made as to whether FTHS is set to 1. When FTHS has been set to 1 at the above-described step S24, the program proceeds to step S9-12, where FOUT is set to 1 and FIN is reset to 0.

NVTEXDO is set depending on that number of rotation of the crank shaft which is required for the intake stroke of all of the cylinders 2 in the first bank 1$_1$ to complete after the switching means 11$_1$ on the intake side has been switched to the side of stopping the valves. In FIG. 7, NVTEXDO is set to 2. In this manner, irrespective of the rotational frequency of the engine, the driving of the exhaust valves will be stopped after the air intake into all of the cylinders 2 in the first bank 1$_1$ has been stopped. Therefore, the torque loss in the compression stroke and the exhaust stroke due to the compression of the intake air can be prevented.

Once FOUT has been set to 1 at step S9-12, a discrimination of FOUT=1 is made at step S3 in FIG. 3, and the program proceeds to step S9 and following steps. As long as the operating states fall within the operating range in which the conditions for the partial-cylinder operation of FST=1 are met, the basic command value of throttle opening degree, THCMDB, is maintained at the throttle opening degree for the partial-cylinder operation, THS.

Figure 6:
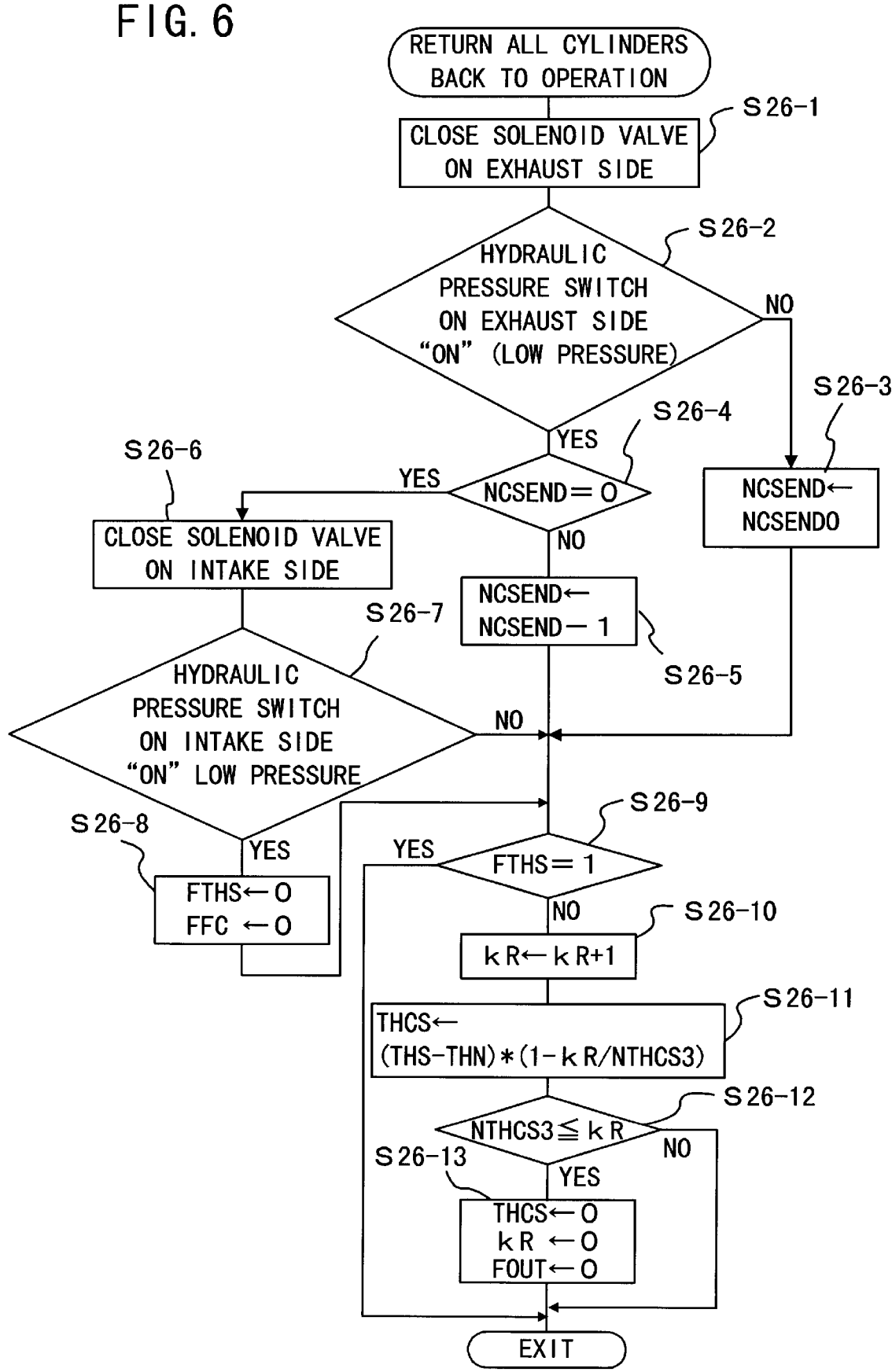
FIG. 6 is a flow chart showing a program for switching back to the all-cylinder operation.

When the operating state has fallen out of the range in which the conditions for the partial-cylinder operation are met, whereby FST is reset to 0, the program proceeds to step S25, where a discrimination is made as to whether FOUT has been set to 1. If FOUT=1, the program proceeds to step S26, where the processing for returning all the cylinders back to operation is performed, and the program then proceeds to step S10. The details of returning all the cylinders back to operation are shown in FIG. 6. First, at step S26-1, the solenoid valve 112g for the switching means 11$_2$ on the exhaust side is closed to thereby connect the driving rocker arms 9$_2$ on the exhaust side with the free rocker arms 10$_2$, 10$_2$, whereby the exhaust valves of the cylinders 2 of the first bank $1_1$ are returned back to the driving state. Then, at step S26-2, a discrimination is made as to whether the hydraulic pressure switch 114 of the switching means $11_2$ on the exhaust side has been switched on, i.e., whether the hydraulic pressure in the switching means $11_2$ has actually been lowered. Until the hydraulic pressure has been lowered, the program proceeds to step S26-3, where a counter value for returning the intake valves, NCSEND, is set to a predetermined set value NCSENDO. Then, the program proceeds to step S26-9 to make a discrimination as to whether FTHS is set to 1. Since FTHS remains to be set to 1 at the above-described step S24 at the time of partial-cylinder operation, a discrimination of FTHS=1 is made. The first round of operations is thus completed. Thereafter, when the hydraulic pressure has risen, the program proceeds to step S26-4, where a discrimination is made as to whether NCSEND has become 0. While NCSEND≠0, the program proceeds to step S26-5 to thereby deduct NCSEND by 1. Thereafter, when the hydraulic pressure has risen and the TDC signal has been inputted for the same number of times as that of NCSENDO to thereby meet the condition of NCSEND=0, the program proceeds to step S266. At this step, the solenoid valve 112g of the switching means on the intake side $11_1$ is closed, and the driving rocker arms $9_1$ on the intake side and the free rocker arms $10_1$, $10_1$ are connected together, whereby the intake valves of the cylinders 2 in the first bank $1_1$ are returned to the driving state. Then, at step S26-7, a discrimination is made as to whether the hydraulic pressure switch 114 for the switching means $11_1$ on the intake side has been switched on. Namely, a discrimination is made as to whether the hydraulic pressure in the switching means $11_1$, on the intake side has actually been lowered. When the hydraulic pressure in the switching means $11_1$ has actually been lowered, the program proceeds to step S26-8, where FTHS and FCC are respectively reset to 0 to resume the fuel supply to the cylinders 2 in the first bank $1_1$. The all-cylinder operation is thus resumed.

Then, the program proceeds to step S26-9, where a discrimination of FTHS≠1 is made this time. The program then proceeds to step S26-10, where a counter value for flattening operation kR is added by 1, and then proceeds to step S26-11, where THCS is made to the value to be obtained by the following formula THCS=(THN−THS)·(1−kR/NTHCS3)

NTHCS3 is the number of flattening operations in order to change, by flattening, the throttle opening degree from the opening degree for the partial-cylinder operation, THS, to the opening degree for the all-cylinder operation, THN. At step S26-12, a discrimination is made as to whether kR has become equal in number to, or above, NTHCS3. As long as kR<NTHCS3, the above-described processing is repeated. Therefore, each time the TDC signal is inputted, THCS changes stepwise by the amount of flattening DTHCS3 which is obtained by substituting THN and THS corresponding to AP and NE respectively at that point of time in the following formula

DTHCS=(THS−THN)/NTHCS3

In this manner, the basic command value for the throttle opening degree, THCMDB, gradually changes, as shown in range E in FIG. 7, from THS to THN.

Once kR has become equal in number to NTHCS3, the program proceeds to step S26-13, where THCS, kR, and FOUT are respectively reset to 0. As a result, the basic command value for the throttle opening degree THCMDB is maintained at the opening degree for the all-cylinder operation THN. Next time, a discrimination of FOUT≠ is made at step S25 in FIG. 3, and the program proceeds to step S27, where a discrimination is made as to whether FIN is set to 1. FIN has been reset to 0 at step S9-12 at the time of the partial-cylinder operation. Therefore, a discrimination of FIN≠1 is made and the program proceeds to step S28, where kF is reset to 0. The program then proceeds to step S9 and following steps. If the operating states fall out of the operating region which meets the partial-operating conditions before setting FOUT and resetting FIN at step S9-12, a discrimination of FOUT≠1 is made at step S25 and also a discrimination of FIN=1 is made at step S27. The program thus proceeds to step S11 and following steps. Therefore, the control performed at the time of the partial-cylinder operation is performed in succession. When the setting of FOUT and the resetting of FIN have been performed at step S9-12, the program proceeds to step S26 and the control to return to the all-cylinder operation is performed.

The above-described NCSENDO is set depending on that number of rotation of the crank shaft which is required for the exhaust stroke to be completed in all of the cylinders 2 in the first bank $1_1$ after the switching means $11_2$ on the exhaust side is switched to the valve driving side. In FIG. 7 NCSENDO is set to 2. In this manner, at the time of returning to the all-cylinder operation, the intake valves will be operated, irrespective of the rotational frequency of the engine, after the exhausting of all the cylinders in the first bank $1_1$ has been completed. As a consequence, it is possible to perform the air intake after having completely scavenged the residual gas containing oil that may have flown into the cylinders 2 in the first bank $1_1$ as a result of flowing in of oil during the partial-cylinder operation. This brings about an improved accuracy of control in the air/fuel ratio. The above-described number of flattening NTHCS3 is stored as table data with the engine rotational frequency NE as a parameter and is set to a minimum value that is required to prevent the torque fluctuations at the time of change in the throttle opening degree from THS to THN.

An explanation has so far been made about a six-cylinder V-type engine. The present invention is, however, applicable to an example in which the operation of part of the cylinders is suspended in a multi-cylinder internal combustion engine in which the cylinders are arranged in a line.

It is readily apparent that the above-described apparatus for controlling a multi-cylinder internal combustion engine with partial cylinder switch-off mechanism meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for controlling a multi-cylinder internal combustion engine with partial cylinder switch-off mechanism, said engine being switchable between an all-cylinder operation in which all cylinders are operated and a partial-cylinder operation in which operation of partial cylinders is suspended, said apparatus comprising:

hydraulically operated valve switching means on an intake side and on an exhaust side, respectively, for switching intake valves and exhaust valves of the partial cylinders between a driving state and a drive-free state, wherein said intake valves and said exhaust valves of the partial cylinders are switched, during the partial-cylinder operation, into the drive-free state;

a control valve on the intake side for switching a hydraulic pressure inputted to said hydraulically operated valve switching means on the intake side between a hydraulic pressure to bring said intake valves into the driving state and a hydraulic pressure to bring said intake valves to the drive-free state;

a control valve on the exhaust side for switching a hydraulic pressure inputted to said hydraulically operated valve switching means on the exhaust side between a hydraulic pressure to bring said exhaust valves into the driving state and a hydraulic pressure to bring said exhaust valves to the drive-free state; and control means for performing the following steps when the intake valves and the exhaust valves of the partial cylinders are switched from one of the driving state and the drive-free state to the other of said states, said steps including: performing hydraulic pressure switching by one of said control valve on the intake side and said control valve on the exhaust side ahead of hydraulic pressure switching by the other of said control valves; counting a subsequent number of rotations of a crankshaft of the engine; and, when the counted number of rotations has reached a predetermined value, performing hydraulic pressure switching by the other of said control valves, said predetermined value being set such that driving of, or resumption of driving of, said intake valves and said exhaust valves for all suspended cylinders is made in a given order irrespective of a rotational frequency of the engine.

2. The apparatus for controlling a multi-cylinder internal combustion engine according to claim 1, wherein, at the time of switching from the all-cylinder operation to the partial-cylinder operation, a throttle opening degree of the engine is switched to that throttle opening degree for the partial-cylinder operation which is set such that an engine output torque does not change before and after the switching, further comprising throttle control means which changes the throttle opening degree by a predetermined amount toward the throttle opening degree for the partial-cylinder operation when an engine operating state has fallen into a predetermined operating region for performing the partial-cylinder operation and thereafter switches to the partial-cylinder operation.

3. The apparatus for controlling a multi-cylinder internal combustion engine according to claim 1, wherein, at the time of switching from the all-cylinder operation to the partial-cylinder operation, a throttle opening degree of the engine is switched to that throttle opening degree for the partial-cylinder operation which is set such that an engine output torque does not change before and after the switching, further comprising throttle control means which makes the throttle opening degree, for an initial predetermined period of time after having switched to the partial-cylinder operation, to a throttle opening degree which exceeds said throttle opening degree for the partial-cylinder operation.

4. The apparatus for controlling a multi-cylinder internal combustion engine according to claim 1, wherein, at the time of switching from the all-cylinder operation to the partial-cylinder operation, a throttle opening degree of the engine is switched to that throttle opening degree for the partial-cylinder operation which is set such that an engine output torque does not change before and after the switching, further comprising: first throttle control means which changes the throttle opening degree by a predetermined amount toward the throttle opening degree for the partial-cylinder operation when an engine operating state has fallen into a predetermined operating region for performing the partial-cylinder operation and thereafter switches to the partial-cylinder operation; and second throttle control means which makes the throttle opening degree, for an initial predetermined period of time after having switched to the partial-cylinder operation, to a throttle opening degree which exceeds said throttle opening for the partial-cylinder operation.

5. The apparatus for controlling a multi-cylinder internal combustion engine according to claim 1, further comprising correcting means which sets a correcting coefficient for the all-cylinder operation and a correcting coefficient for the partial-cylinder operation which is larger than the correcting coefficient for the all-cylinder operation, said correcting coefficients serving as temperature correcting coefficients for increasing, at a time of low temperature, the throttle opening degree depending on an engine temperature, said correcting means operating to switch the temperature correcting coefficients between the correcting coefficient for the all-cylinder operation and the correcting coefficient for the partial-cylinder operation depending on whether the operation is in the all-cylinder operation or in the partial-cylinder operation.

* * * * *